United States Patent Office 3,278,374
Patented Oct. 11, 1966

3,278,374
CYCLIC AMIDINES FOR CONTROL OF BACTERIAL AND FUNGAL DISEASES IN PLANTS
Homer J. Sims, Horsham, Robert L. Skiles, Warminster, and Hans P. Frohlich, Churchville, Pa., assignors to Rohm & Haas Company, Philadelphia, Pa., a corporation of Delaware
No Drawing. Filed Mar. 2, 1964, Ser. No. 348,757
5 Claims. (Cl. 167—33)

This application is a continuation-in-part of application Serial No. 283,981, filed May 29, 1963, which application is now abandoned.

This invention deals with agricultural compositions for preventing and eradicating bacterial and fungal diseases of plant life. It further deals with a method for controlling such bacterial and fungal diseases. The active ingredients in these agricultural preparations and processes are specific cyclic amidines and their acid-addition salts.

The cyclic amidines of the present invention may be represented by the formula

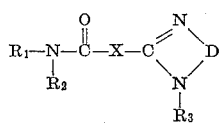

in which $R_1$ is alkyl of 1 to 24 carbon atoms or phenyl, naphthyl, benzyl or alkyl-substituted phenyl, naphthyl or benzyl, in which the total alkyl substituents contain up to 16 carbon atoms; $R_2$ is hydrogen or alkyl of 1 to 24 carbon atoms; collectively $R_1$ and $R_2$ may form a ring with the nitrogen atom to which they are joined, namely, morpholino, thiamorpholino, piperidino and pyrrolidinyl; X is ethenylene, ethylene, trimethylene, alkyl or alkenyl-substituted ethylene having a total of up to 20 carbon atoms, a 1,2-cyclohexylene or alkyl-substituted 1,2-cyclohexylene having a total of up to 16 carbon atoms, 1,2-cyclohexenylene or alkyl-substituted 1,2-cyclohexenylene having a total of up to 16 carbon atoms, 3,6-methano-1,2-cyclohexylene and 3,6-methano-1,2-cyclohexenylene; $R_3$ is hydrogen, 2-hydroxyethyl, 2-aminoethyl, 2- or 3-hydroxypropyl, 2- or 3-aminopropyl, 2- or 3-(2-aminoethyl)aminopropyl, 2- or 3-(2- or 3-aminopropyl)aminopropyl or 2-(2-aminoethyl)aminoethyl and D is a divalent saturated chain of 2 to 3 carbon atoms whose available valences are satisfied by hydrogen atoms or alkyl groups having a total of up to 12 carbon atoms and combinations of hydrogen and alkyl groups having a total of up to 12 carbon atoms or 1,2-cyclohexylene.

Typically, $R_1$ repersnets methyl, butyl, octyl, dodecyl, octadecyl, tetracosyl, phenyl, naphthyl, benzyl, octylphenyl, butylnaphthyl and octylbenzyl.

Typical embodiments of $R_2$ include hydrogen, methyl, butyl, octyl, dodecyl, octadecyl, eicosyl and tetracosyl.

Typical embodiments of $R_3$ include hydrogen, 2-hydroxyethyl and 2-aminoethyl.

Typical embodiments of X include ethylene, trimethylene, ethenylene, dimethylethylene, octylethylene, dodecylethylene, dodecylbutylethylene, dodecenylethylene, cyclohexylene, methylcyclohexenylene, octylcyclohexenylene and 3,6-methano-1,2-cyclohexenylene.

Typical embodiments of the symbol D include ethylene, dimethylethylene, butylethylene, octylethylene, propylene, dimethylpropylene, butylpropylene, octylpropylene and 1,2-cyclohexylene.

A particularly effective embodiment of the above cyclic amidines includes either $R_1$ or $R_2$ as a tertiary-alkyl group, that is, an alkyl group having the configuration:

in which A represents alkyl groups that total from 3 to 23 carbon atoms, preferably from 11 to 23 carbon atoms. Particularly outstanding results are obtained when this spatial configuration is present in either of $R_1$ or $R_2$. In all respects, with regard to the groups, $R_1$ and $R_2$, but particularly when the tertiary-alkyl structure is contemplated, each of $R_1$ and $R_2$ may represent a single alkyl group of mixtures of alkyl groups within the stated carbon content range. Commercially available compounds that provide this part of the molecule are known to contain mixtures of alkyl groups. Particularly outstanding in this respect are those in which either $R_1$ or $R_2$ represents a mixture of tertiary-alkyl groups containing 12 to 15 carbon atoms averaging 13 carbon atoms or a mixture of 18 to 24 carbon atoms.

Especially outstanding embodiments are those in which $R_1$ represents tertiary-alkyl of 4 to 24 carbon atoms, phenyl or benzyl, $R_2$ is hydrogen or alkyl of 4 to 24 carbon atoms, $R_3$ is hydrogen, hydroxyethyl or aminoethyl, X is ethylene, ethenylene, trimethylene, dodecenylethylene or 1,2-cyclohex-4-enylene and D represents ethylene.

It is to be construed that the present invention also includes the acid-addition salts of these cyclic amidines. In certain cases, a salt may show a biological advantage over the free-base form. For instance, a salt may have increased water solubility, increased ease of formulation, more resistance to hydrolysis and more favorable phytotoxic characteristics. There are applications where such improved properties are highly desirable.

The cyclic amidines of the present invention are prepared by reacting a compound having the formula

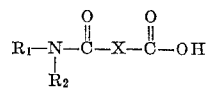

with one having the formula $$R_3NHDNH_2$$

at the reflux temperature of the reaction system. It is possible to conduct the reaction without a solvent or if a solvent is preferred, which is generally the case, one may employ an inert aromatic compound, such as benzene, toluene, xylene or the like. Toluene and xylene are preferred, particularly with the higher molecular weight reactants. The reaction is conducted at the boiling point of the reaction system and is continued until two moles of water per mole of acid is removed. The water is removed from the reaction mixture as the reaction progresses either by distillation or, when a solvent is employed, by an azeotropic distillation. The reagents are employed in equimolecular quantities or, if desired, an excess of the amine may be used. If excess amine is employed in order to assure highest yields, the excess may be removed by distillation, such as under reduced pressure, or small amounts of excess amine need not be removed since it does not interfere with the functioning and utility of the cyclic amidine product.

Yields of the cyclic amidine product are consistently in excess of 90% and frequently approach a quantitative result. Typical embodiments of the amine reactants include ethylenediamine, diethylenetriamine, triethylenetetraamine, hydroxyethylethylenediamine, propylenediamine, dipropylenetriamine, tripropylenetetraamine, hydroxyethylpropylenediamine. Typical embodiments of the amido-acid reactants include N-butylmaleamic, N-octylmaleamic, N-dodecylmaleamic, N-octadecylmaleamic, N-benzylmaleamic, N-phenylmaleamic, N-naphthylmaleamic, N-butylsuccinamic, N,N-dioctylsuccinamic, N-octylsuccinamic, N-dodecylsuccinamic, N-octadecylsuccinamic, N-phenylsuccinamic, N-benzylsuccinamic, N-butyldodecenylsuccinamic N-octylcumylsuccinamic, N-octyloctenylsuccinamic, N-phenyldodecenylsuccinamic, N-dodecylglutaramic, N-octadecylglutaramic, N-t-dodecyltetrahydrophthalamic, N-butyltetrahydrophthalamic, N-octadecyltetrahydrophthalamic, N-dodecyl-3,6-methanotetrahydrophthalamic and N-octyltetrahydrophthalamic acids.

In order to prepare the salt forms of cyclic amidines, it is necessary only to react these compounds with a stoichiometric equivalent of the selected acid. Salt formation occurs readily at room temperature without the aid of a catalyst. It may be advantageous to use an inert, volatile solvent; for example, aromatic hydrocarbons such as benzene and toluene, aliphatic hydrocarbons such as hexane, chlorinated aliphatic solvents such as chloroform and alcohols. The use of a solvent facilitates mixing and the solvent can be readily removed at the conclusion of the reaction by conventional methods. In cases where an aqueous acid is used, an azeotroping solvent may be used to remove the water by azeotropic distillation or the water may be removed by distilling it off under reduced pressure. As a rule, the salt product does not require any further purification, but in certain cases it may be desirable to purify it by extraction techniques, recrystallization and other conventional means.

Typical acids which may be employed are such mineral acids as hydrochloric, hydrobromic, nitric, sulfuric, phosphoric and boric; monobasic aliphatic acids such as formic, acetic, propionic, stearic, pyruvic, acrylic and methacrylic; aromatic acids such as benzoic and phthalic; dicarboxylic organic acids such as carbonic, oxalic and maleic; and amic acids such as glutamic and the amic acids used as precursors of the cyclic amidines of this invention such as N-t-tridecylmaleamic acid and N-t-octadecylsuccinamic acid.

Particularly effective salts for fungicidal purposes are those made from cyclic amidines of the above general structure wherein $R_1$ is a tertiary alkyl group averaging 4 to 24 carbon atoms, $R_2$ is hydrogen, $R_3$ is 2-hydroxyethyl and X and D are ethylene. The following table shows typical salts made from one of the preferred cyclic amidines.

TABLE I.—ACID-ADDITION SALTS OF β-[1-(2-HYDROXYETHYL)-2-IMIDAZOLIN-2-YL]-N-t-OCTADECYLPROPIONAMIDE

| Acid Added | Moles of Acid Added Per Mole of Amidine | Remarks on Preparation |
| --- | --- | --- |
| HCl (36%) | 1.0 | Water removed at reduced pressure. |
| $H_2SO_4$ (96%) | 0.5 | Benzene solvent used, azeotroped off the water. |
| $H_2SO_4$ (96%) | 1.0 | Do. |
| $H_3PO_4$ (85%) | 1.0 | Water removed at reduced pressure. |
| $H_3BO_3$ | 1.0 | Methanol solvent used. |
| Acetic acid | 1.0 | |
| Benzoic acid | 1.0 | |
| N-t-octadecylsuccinamic acid | 1.0 | |

As a rule, the ultraviolet spectra of these salts is very similar to the spectrum of the parent amidine; exceptions are the benzoate and borate salts. The infrared spectra of the salts from inorganic acids show sharp peaks at 6.05μ and 6.25μ.

The cyclic amidines employed in the present invention may be more fully understood from the following examples which are offered by way of illustration and not by way of limitation. Parts by weight are used throughout.

EXAMPLE 1

*Preparation of β - [1 - (β-aminoethyl)-2-imidazolin-2-yl]-N-t-octadecylacrylamide*

A solution of N-t-octadecylmaleamic acid (215 parts) and diethylenetriamine (51.5 parts) in 350 parts of xylene is heated to reflux and the evolved water removed by azeotropic distillation. After 12 hours of refluxing, 18 parts of water and 1.5 parts of excess amine are removed. The solvent is then removed under reduced pressure and the product obtained as the residue. The product contains 10.3% nitrogen (theoretical 11.3%) and is identified as the compound of the present invention wherein $R_1$ is a mixture of tertiary-alkyl groups averaging 18 carbon atoms, $R_2$ is hydrogen, $R_3$ is 2-aminoethyl, X is ethenylene and D is ethylene.

Similarly, a compound of the present invention is prepared exactly as above except that $R_3$ represents 2-hydroxyethyl. The product contains 8.2% hydrogen (theoretical 8.4%) and has a neutral equivalent of 485 (theoretical 498).

EXAMPLE 2

*Preparation of β-[1-(β-aminoethyl)-2-imidazolin-2-yl]-N,N-dihexadecylacrylamide*

A solution of N,N-dihexadecylmaleamic acid (269 parts) and diethylenetriamine (55 parts) in 400 parts of xylene is refluxed for 3 hours during which time 18 parts of water is azeotropically removed. The xylene is removed leaving a residue of 307 parts of a product which is identified as the cyclic amidine of this invention in which $R_1$ and $R_2$ are hexadecyl, $R_3$ is 2-aminoethyl, X is ethenylene and D is ethylene. The product contains 8.6% nitrogen (9.3% theoretical).

Similarly, there is prepared a product of this invention wherein $R_1$ and $R_2$ are octadecyl, $R_3$ is 2-aminoethyl, X is ethenylene and D is ethylene; the product contains 7.1% nitrogen (8.0% theoretical).

EXAMPLE 3

*Preparation of β-(2-imidazoline -2-yl)-N-t-octadecylacrylamide*

A solution of N-t-octadecyl-maleamic acid (43.6 parts) and ethylenediamine (6.0 parts) in 86 parts of xylene is heated to reflux and the water removed as an azeotropic mixture. After 2 hours, 2.2 parts of aqueous layer has been removed and 3.0 parts of ethylenediamine is added. Refluxing is resumed for 3 hours, after which time a total of 5.0 parts of aqueous layer containing 3.0 parts of water and 2.0 parts of amine has been removed. The xylene is then removed by vacuum distillation leaving 48 parts of product as the residue. The product contains 9.2% nitrogen (9.1% theoretical). The product is a cyclic amidine in which $R_1$ is tertiary-octadecyl, $R_2$ is hydrogen $R_3$ is hydrogen, D is ethylene and X is ethenylene Similarly, there is prepared a product of this invention having the same structure as that above except that $R_1$ represents tertiary-octyl.

There are also prepared in a similar manner, the products of the present invention in which $R_1$ represents dodecyl or octadecyl, $R_2$ is hydrogen, $R_3$ is hydrogen or 2-aminoethyl, X is ethenylene and D is ethylene.

EXAMPLE 4

*Preparation of β-[1-(β-aminoethyl)-2-imidazolin-2-yl]- N-t-tridecylacrylamide*

There are mixed together 29.1 parts of N-t-tridecylmaleamic acid (in which the tridecyl represents a mixture of tertiary-alkyl groups of 12 to 15 carbon atoms having an average of 13 carbon atoms) and 10.3 parts of diethylenetriamine. The temperature rises to about 80° C. and the mixture is then heated up to 155° C. over a period of 2½ hours under a slow stream of nitrogen. Water is distilled off and the heating discontinued. The mixture is cooled to about 100° C. and the remainder of water removed. A total of 3.8 parts of distillate is collected containing 0.5 parts of amine. The product is recovered as a residue amounting to 35.1 parts and contains 14.2% nitrogen (15.6% theoretical). The product has a neutral equivalent of 208 (179 theoretical). The product is a cyclic amidine in which $R_1$ is teriary-tridecyl, $R_2$ is hydrogen, $R_3$ is 2-aminoethyl, X is ethenylene and D is ethylene.

In a similar way, similar products of the present invention are prepared which have the same structure as above except that when $R_3$ represents hydrogen, the product contains 12.7% nitrogen (13.3% theoretical) and has a neutral equivalent of 298 (315 theoretical) and when $R_3$ represents 2-hydroxyethyl, the product contains 10.6% nitrogen (11.6% theoretical). These compounds are quite active in the control of bacterial diseases.

EXAMPLE 5

*Preparation of 2-[1 - (β - aminoethyl)-2-imidazolin-2-yl]- N-t-octadecyl-1,2,3,6-tetrahydrobenzamide*

A mixture of N-t-octadecyletrahydrophthalamic acid (94.8 parts) and diethylenetriamine (20.6 parts) is refluxed in 367 parts of xylene for 5 hours. The water evolved is removed by azeotropic distillation. After 5 hours, an additional 2.8 parts of diethylenetriamine is added and refluxing continued for 24 hours. The xylene is removed under pressure and the product is recovered as the residue. The product is a cyclic amidine of this invention in which $R_1$ represents an alkyl group having a tertiary-alkyl structure and containing an average of 18 carbon atmos, $R_2$ is hydrogen, $R_3$ is 2-aminoethyl, X is cyclohexenylene and D is ethylene. The product contains 9.0% nitrogen (10.3% theoretical). It is particularly effective as an apple scab toxicant.

Similarly, there are prepared the products of this invention wherein $R_1$ represents a mixture of tertiary-alkyl groups of 12 to 15 carbon atoms averaging 13 carbon atoms, $R_2$ is hydrogen, $R_3$ is hydrogen, 2-hydroxyethyl or 2-aminoethyl, X is cyclohexenyl and D is ethylene. When $R_3$ is 2-aminoethyl, the product contains 12.8% nitrogen (13.5% theoretical). When $R_3$ is 2-hydroxyethyl, the product contains 11.9% nitrogen (11.3% theoretical).

EXAMPLE 6

*Preparation of β-[1-(2-hydroxyethyl)-2-imidazolin-2-yl]- N-t-octadecylpropionamide*

A solution of N-t-octadecylsuccinamic acid (216 parts) and 2-hydroxyethylenediamine (52 parts) in 367 parts of xylene is refluxed. The water that is formed is removed as an azeotropic mixture over 15 hours. The aqueous layer contains 1.3 parts of amine. The xylene is removed under reduced pressure leaving 260 parts of product as the residue. The product contains 7.6% nitrogen (7.6% theoretical). It has a neutral equivalent of 497 (500 theoretical). It is a cyclic amidine in which $R_1$ is tertiaryoctadecyl, $R_2$ is hydrogen, $R_3$ is 2-hydroxyethyl and X and D are ethylene. This compound gives excellent control of both bacterial and fungal diseases.

In a similar way, there is prepared the product of this invention wherein $R_1$ represents tertiary-alkyl groups having an average of 18 carbon atoms, $R_2$ is hydrogen, $R_3$ is hydrogen and X and D are ethylene. This product contains 8.3% nitrogen (9.1% theoretical).

Similarly, in the above preparation when N-t-octadecylsuccinamic acid is substituted with on equivalent quantity of N-t-octadecylglutaramic acid, a similar product is produced wherein X is trimethylene. This product contains by analysis 71.49% carbon (72.76% theoretical), 12.26% hydrogen (12.53% theoretical) and 8.74% nitrogen (8.35% theoretical). This compound gives excellent control of fungal diseases.

Similarly, a product is prepared as above wherein $R_3$ represents 2-aminoethyl and contains 9.1% nitrogen (9.2% theoretical).

In like manner, there are prepared the cyclic amidines of the present invention wherein $R_1$ represents a mixture of tertiary-alkyl containing 12 to 15 carbon atoms, averaging 13 carbon atoms, $R_2$ is hydrogen, $R_3$ is hydrogen, 2-aminoethyl or 2-(2-aminoethyl)aminoethyl, and X and D are ethylene. When $R_3$ is 2-aminoethyl, the product has a neutral equivaent of 189 (180 theoretical). When $R_3$ represents 2-(2-aminoethyl, the product contains 15.7% nitrogen (17.3% theoretical). When $R_3$ is hydrogen, the product contains 12.7% nitrogen (13.2% theoretical) and has a neutral equivalent of 298 (315 theoretical).

EXAMPLE 7

*Preparation of β-[1-(β-aminoethyl)-2-imidazolin - 2 - yl] N-t-butyldodecenylpropionamide*

A solution of N-t-butyldodecenylsuccinamic acid 67.8 parts) and diethylenetriamine (20.6 parts in 200 parts of xylene is refluxed for 8 hours during which time the water is removed as an azeotropic mixture. An addition 2.3 parts of diethylenetriamine is introduced and refluxing is continued for an additional 5 hours. A total of 8.3 parts of aqueous layer is separated. The reaction mixture is stripped leaving the product as a residue of 72 parts. The product has a neutrol equivalent of 205 (203 theoretical). The product is the cyclic amidine of this invention wherein $R_1$ is tertiary-butyl, $R_2$ is hydrogen, $R_3$ is 2-aminoethyl, X is dodecenylethylene and D is ethylene. This compound is quite active in the control of bacterial diseases.

In like manner, a similar product is prepared in which $R_1$ represents a mixture of tertiary-alkyl groups containing from 12 to 15 carbon atoms, averaging 13 carbon atoms, $R_2$ is hydrogen, $R_3$ is hydrogen, X is dodecenylethylene and D is ethylene.

EXAMPLE 8

*Preparation of β-[1-(γ-aminopropylaminoethyl)- 1,4,5,6 - tetrahydro-pyrimiden-2yl]-N-t-octadecylacrylamide*

A solution of N-t-octadecylmaleamic acid (43.0 parts) and N,N'-bis(γ-aminopropyl)ethylenediamine (20 parts) in 200 ml. of xylene is heated at reflux for 2½ hours. The water which forms is removed by azeotropic distillation. After 3.8 parts of water has been collected, the solvent is removed leaving a residue of 60.3 parts. The product contains 11.4% nitrogen (11.8% theoretical) and is a cyclic amidine of this invention in which $R_1$ is tertiary-octadecyl, $R_2$ is hydrogen, $R_3$ is β-(γ-aminopropyl-ethyl, X is ethenylene and D is trimethylene.

A similar compound may be made from N-t-tridecyl-succinamic acid (31.1 parts) and N,N'-bis(γ-aminopropyl) ethylenediamine (20 parts).

EXAMPLE 9

*Preparation of β-[1-(β-aminoethyl)-2-imidazolin-2-yl]-N-phenyldodecenylpropionamide*

A solution of N-phenyldodecenylsuccinamic acid (36 parts, 0.1 mole) and diethylenetriamine (10.3 parts, 0.1 mole) in xylene (100 parts) is heated at reflux for a total of 21 hours while water is removed azeotropically. A total of 3.7 parts of aqueous layer is collected containing 3.1 parts of water. The xylene solvent is removed under vacuum. This also removes some aniline which is displaced during the reaction. The residue has less than 3% acid as determined by titration with alcoholic potassium hydroxide. The neutralization equivalent of the residue is 223 (theoretical 213). The product is a cyclic amidine in which $R_1$ is phenyl, $R_2$ is hydrogen, $R_3$ is 2-aminoethyl, X is dodecenylethylene and D is ethylene. It gives excellent control of bacterial diseases.

A similar product is prepared where $R_1$ is tertiaryoctyl.

EXAMPLE 10

*Preparation of β-[1-(β-aminoethyl)-2-imidazolin-2-yl]-N-t-octylpropionamide*

A mixture of N-t-ocylsuccinamic acid (22.9 parts, 0.1 mole) and diethylenetriamine (10.3 parts, 0.1 mole) in 150 parts of xylene is heated to reflux for 12 hours. Water is removed azeotropically. The aqueous layer which collected in the water separator weighs 3.7 parts and contains 3.3 parts of water. The xylene is removed from the reaction mixture by distillation up to about 80° C. at 20 mm. of mercury. The residue (27.4 parts) has a neutralization equivalent of 147 and contains 18.1% nitrogen (theoretical 18.9%). The product is a cyclic amidine in which $R_1$ is tertiary-octyl, $R_2$ is hydrogen, $R_3$ is 2-aminoethyl, X is ethylene and D is ethylene.

EXAMPLE 11

*Preparation of β-[1-(β-hydroxyethyl)-2-imidazolin-2-yl]-N-t-octadecylmethylpropionamide*

A solution of N-t-octadecylmethylsuccinamic acid (44.6 parts, 0.1 mole) and hydroxyethylethylenediamine (10.4 parts, 0.1 mole) in xylene (87 parts) is refluxed and water collected as an azeotrope. After 13 hours, a theoretical amount of water has collected (3.6 parts). The solvent is removed under aspirator vacuum leaving 52 parts of product in which $R_1$ is octadecyl, $R_2$ is hydrogen, $R_3$ is 2-hydroxyethyl, X is methylethylene and D is ethylene. Analysis shows 7.8% nitrogen (8.17% theoretical).

Similarly, a product is prepared as above wherein $R_3$ represents 2-aminoethyl and contains 10.0% nitrogen (10.9% theoretical) and has a neutral equivalent of 248 (257 theoretical).

EXAMPLE 12

*Peparation of β-[1-(β-hydroxyethyl)-2-imidazolin-2-yl]-N-phenylpropionamide*

N-phenylsuccinamic acid (19.3 parts, 0.1 mole) and diethylenetriamine (10.3 parts, 0.1 mole) in xylene is reacted in a manner similar to that of Example 11 to obtain a product in which $R_1$ is phenyl, $R_2$ is hydrogen, $R_3$ is 2-aminoethyl, X is ethylene and D is ethylene.

EXAMPLE 13

*Preparation of β-[1-(β-aminoethyl)-2-imidazolin-2-yl]-N-t-octyldodecenylpropionamide*

By the method of Example 11, N-t-octyldodecenylsuccinamic acid (79 parts, 0.2 mole) in diethylenetriamine (20.6 parts, 0.2 mole) are reacted to yield a product in which $R_1$ is tertiary-octyl, $R_2$ is hydrogen, $R_3$ is 2-aminoethyl, X is dodecenylethylene and D is ethylene.

The neutralization equivalent is 245 (231 theoretical).

The cyclic amidines of this invention, and it is to be understood that this term includes their acid-addition salts, possess biocidal properties and are especially useful as agricultural fungicides and bactericides. They are particularly outstanding for the control of apple scab, possessing both protective and eradicative properties, and of bacterial leaf spot. When the cyclic amidines are used as agricultural and horticultural pesticides on living plants, it is preferred that they be relatively non-phytotoxic.

For use as pesticides, the compounds of this invention are usually taken up in a carrier or are formulated so as to render them suitable for subsequent dissemination as pesticides. For example, the cyclic amidines may be formulated as wettable powders, emulsion concentrates, dusts, granular formulations, aerosols or flowable emulsion concentrates. In such formulations, the cyclic amidines are extended with a liquid or solid carrier and, when desired, suitable surfactants are incorporated.

The compounds of this invention may be dissolved in a water-miscible liquid such as ethanol, isopropanol or acetone, and such solutions extended with water.

The cyclic amidines may be taken up on or mixed with a finely particled solid carrier, such as clays, inorganic silicates and carbonates, silicas and organic carriers. Dust concentrates in which cyclic amidines are present in the range of 20 to 80% are commonly made and these are subsequently extended with additional solid to about 1 to 20% for ultimate application.

Wettable powder formulations are made by incorporating the compounds of this invention in an inert, finely divided solid carrier and a surfactant which may be one or more emulsifying, wetting, dispersing or spreading agents or blend of these. The cyclic amidines are usually present in the range of 10 to 80% by weight and the surfactants in from 0.5 to 10% by weight. Commonly used emulsifying and wetting agents include polyoxyethylated alkylphenols, fatty alcohols, fatty acids and alkylamines, alkylarene sulfonates and dialkyl sulfosuccinates; spreading agents include such materials as glycerol mannitan laurate and a condensate of polyglycerol and oleic acid, modified with phthalic anhydride and dispersing agents include such materials as the sodium salt of the copolymer of maleic anhydride and an olefin such as diisobutylene, sodium lignin sulfonate and sodium formaldehyde-naphthalene sulfonates.

One convenient method for preparing a solid formulation is to impregnate the cyclic amidine toxicant onto the solid carrier by means of a volatile solvent, such as acetone. In this manner, adjuvants, such as activators, adhesives, plant nutrients, synergists and various surfactants, may also be incorporated.

Emulsion concentrate formulations may be made by dissolving the cyclic amidines of this invention in an agronomically acceptable organic solvent and adding a solventsoluble emulsifying agent. Suitable solvents are usually water-immiscible and may be found in the hydrocarbon, chlorinated hydrocarbon, ketone, ester, alcohol and amide classes of organic solvents. Mixtures of solvents are commonly employed. The surfactants useful as emulsifying agents may constitute about 0.5% to 10% by weight of the emulsion concentrate and may be anionic, cationic or non-ionic in character. Anionic surfactants include alcohol sulfates or sulfonates, alkylarene sulfonates and sulfosuccinates. Cationic surfactants include fatty acid alkyl amine salts and fatty acid alkyl quaternaries. Non-ionic emulsifying agents which may be used include ethylene oxide adducts of alkylphenols, fatty alcohols, mercaptans or fatty acids. The concentration of the active ingredients may vary from 10 to 80% but is preferably in the range of 25 to 50%.

For use as pesticides, these compounds should be applied in an amount sufficient to exert the desired biocidal activity by techniques well known in the art.

In dilute sprays, they may be applied at concentrations of 0.05 to 20 pounds of the active ingredient per 100 gallons of spray, are usually applied at 0.1 to 10 pounds per 100 gallons and preferably at 0.125 to 5 pounds per 100 gallons. In more concentrated sprays, the active ingredient is increased by a factor of 2 to 12. With dilute sprays, applications are usually made to the plants until run-off is achieved, whereas with more concentrated sprays the materials are applied as mists.

The compounds of this invention may be used as the sole pesticidal agents or they may be used in conjunction with other fungicides or with insecticides, miticides and comparable pesticides.

Particularly effective embodiments of this invention are tabled below.

TABLE II

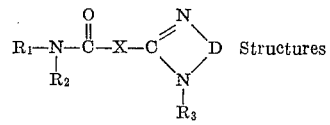 Structures

| Compound | $R_1$ | $R_2$ | $R_3$ | X | D |
|---|---|---|---|---|---|
| A | $t\text{-}C_8H_{17}$ | H | $CH_2CH_2NH_2$ | $CH_2CH_2$ | $CH_2CH_2$ |
| B | $t\text{-}C_8H_{17}$ | H | $CH_2CH_2OH$ | $CH_2CH_2$ | $CH_2CH_2$ |
| C | $t\text{-}C_{13}H_{17}$ | H | H | $CH_2CH_2$ | $CH_2CH_2$ |
| D | $t\text{-}C_{13}H_{17}$ | H | $CH_2CH_2NH_2$ | $CH_2CH_2$ | $CH_2CH_2$ |
| E | $t\text{-}C_{13}H_{17}$ | H | $(CH_2)_2NH(CH_2)_2NH_2$ | $CH_2CH_2$ | $CH_2CH_2$ |
| F | $t\text{-}C_{18}H_{37}$ | H | H | $CH_2CH_2$ | $CH_2CH_2$ |
| G | $t\text{-}C_{18}H_{37}$ | H | $CH_2CH_2NH_2$ | $CH_2CH_2$ | $CH_2CH_2$ |
| H | $t\text{-}C_{18}H_{37}$ | H | $CH_2CH_2OH$ | $CH_2CH_2$ | $CH_2CH_2$ |
| I | $C_6H_5$ | H | $CH_2CH_2NH_2$ | $CH_2CH_2$ | $CH_2CH_2$ |
| J | $t\text{-}C_{18}H_{37}$ | H | $CH_2CH_2NH_2$ | $CH_2C(CH_3)H$ | $CH_2CH_2$ |
| K | $t\text{-}C_{18}H_{37}$ | H | $CH_2CH_2OH$ | $CH_2C(CH_3)H$ | $CH_2CH_2$ |
| L | $t\text{-}C_4H_9$ | H | $CH_2CH_2NH_2$ | $CH_2C(C_{12}H_{23})H$ | $CH_2CH_2$ |
| M | $t\text{-}C_8H_{17}$ | H | $CH_2CH_2NH_2$ | $CH_2C(C_{12}H_{23})H$ | $CH_2CH_2$ |
| N | $t\text{-}C_{13}H_{27}$ | H | H | $CH_2C(C_{12}H_{23})H$ | $CH_2CH_2$ |
| O | $C_6H_5$ | H | H | $CH_2C(C_{12}H_{23})H$ | $CH_2CH_2$ |
| P | $C_6H_5$ | H | $CH_2CH_2NH_2$ | $CH_2C(C_{12}H_{23})H$ | $CH_2CH_2$ |
| Q | $C_6H_5$ | H | $CH_2CH_2OH$ | $CH_2C(C_{12}H_{23})H$ | $CH_2CH_2$ |
| R | $n\text{-}C_{12}H_{25}$ | H | H | $CH=CH$ | $CH_2CH_2$ |
| S | $n\text{-}C_{12}H_{25}$ | H | $CH_2CH_2NH_2$ | $CH=CH$ | $CH_2CH_2$ |
| T | $t\text{-}C_{13}H_{27}$ | H | H | $CH=CH$ | $CH_2CH_2$ |
| U | $t\text{-}C_{13}H_{27}$ | H | $CH_2CH_2NH_2$ | $CH=CH$ | $CH_2CH_2$ |
| V | $t\text{-}C_{13}H_{27}$ | H | $CH_2CH_2OH$ | $CH=CH$ | $CH_2CH_2$ |
| W | $n\text{-}C_{18}H_{37}$ | H | $CH_2CH_2NH_2$ | $CH=CH$ | $CH_2CH_2$ |
| X | $t\text{-}C_{18}H_{37}$ | H | H | $CH=CH$ | $CH_2CH_2$ |
| Y | $t\text{-}C_{18}H_{37}$ | H | $CH_2CH_2NH_2$ | $CH=CH$ | $CH_2CH_2$ |
| Z | $t\text{-}C_{18}H_{37}$ | H | $CH_2CH_2OH$ | $CH=CH$ | $CH_2CH_2$ |
| AA | $n\text{-}C_{16}H_{33}$ | $n\text{-}C_{16}H_{33}$ | $CH_2CH_2NH_2$ | $CH=CH$ | $CH_2CH_2$ |
| AB | $n\text{-}C_{18}H_{37}$ | $n\text{-}C_{18}H_{37}$ | $CH_2CH_2NH_2$ | $CH=CH$ | $CH_2CH_2$ |
| AC | $t\text{-}C_{13}H_{27}$ | H | H | phenylene | $CH_2CH_2$ |
| AD | $t\text{-}C_{13}H_{27}$ | H | $CH_2CH_2NH_2$ | phenylene | $CH_2CH_2$ |
| AE | $t\text{-}C_{13}H_{27}$ | H | $CH_2CH_2OH$ | phenylene | $CH_2CH_2$ |
| AF | $t\text{-}C_{18}H_{37}$ | H | $CH_2CH_2NH_2$ | phenylene | $CH_2CH_2$ |
| AG | $t\text{-}C_{18}H_{37}$ | H | $(CH_2)_2NH(CH_2)_3NH_2$ | $CH=CH$ | $CH_2CH_2CH_2$ |
| AH | $t\text{-}C_{18}H_{37}$ | H | $CH_2CH_2OH$ | $CH_2CH_2CH_2$ | $CH_2CH_2$ |
| AI | (Hydrochloride of Compound H) | | | | |
| AJ | (Acetate of Compound H) | | | | |
| AK | ($t\text{-}C_{18}H_{37}NHCOCH_2CH_2COOH$ salt of Compound H) | | | | |

The cyclic amidines of this invention were evaluated as fungicides by the standard slide spore germination test (cf. Phytopathology, 33, 627 (1943)), utilizing spores of *Alternaria solani* (Alt.), *Monilinia fructicola* (Mon.) and *Stemphylium sarcinaeforme* (Stem.). The values obtained for the concentration in parts per million (p.p.m.) which effectively controlled 50% of the spores ($ED_{50}$) are given in Table III.

TABLE III.—FUNGITOXICITIES OF CYCLIC AMIDINES

| Compound (See Table II) | $ED_{50}$ (p.p.m.) | | |
|---|---|---|---|
| | Alt. | Mon. | Stem. |
| A | <50 | <50 | <50 |
| B | <1,000 | <200 | <1,000 |
| C | <200 | <200 | <50 |
| D | <50 | <50 | <50 |
| E | <1 | <1 | <1 |
| F | <1 | <1 | <1 |
| G | <1 | <1 | <10 |
| H | <50 | <10 | <10 |
| I | <10 | <50 | <10 |
| J | <10 | <10 | <1 |
| K | <10 | <10 | <1 |
| L | <50 | <50 | <10 |
| M | <50 | <10 | <50 |
| N | <50 | <50 | <50 |
| O | <50 | <50 | <200 |
| P | <50 | <50 | <10 |
| Q | <50 | <50 | <50 |
| R | <50 | <50 | <50 |
| S | <50 | <50 | <50 |
| T | <50 | <50 | <50 |
| U | <50 | <50 | <50 |
| V | <50 | <200 | <50 |
| W | <50 | <50 | <50 |
| X | <50 | <50 | <50 |
| Y | 10 | <10 | <10 |
| Z | <50 | <10 | 10 |
| AA | <1,000 | <50 | <50 |
| AB | | <50 | <1,000 |
| AC | <200 | <50 | <50 |
| AD | <50 | <50 | <50 |
| AE | <200 | <200 | <200 |
| AF | <1 | <1 | <1 |
| AG | <1 | <10 | <1 |
| AH | <1 | <1 | <10 |
| AI | <1 | <1 | <10 |
| AJ | <1 | <1 | <10 |
| AK | <1,000 | <200 | <50 |

Representative cyclic amidines of this invention were evaluated for the control of apple scab in a protective type test. In this test, apple seedlings at the 4 to 5 leaf stage were sprayed with the chemical at concentrations varying from one-sixteenth to one pound per 100 gallons of spray and then allowed to dry. There were 4 plants per treatment. The plants were then inoculated with a conidial suspension of *Venturia inaequalis* containing 30,000 spores per milliliter. The inoculated plants were then incubated overnight at 65° F. in high humidity chambers. Thereafter, they were held in the greenhouse at 70° F. until apple scab lesions appeared 8 to 11 days later. The percent control of the applie scab was calculated from the number of lesions on treated plants and those on untreated controls. The percent disease control is given below in Table IV.

TABLE IV.—PROTECTIVE APPLE SCAB FUNGICIDE TESTS

| Compound (See Table II) | Percent Control of Apple Scab at— | | | |
|---|---|---|---|---|
| | 1 lb. | 0.25 lb. | 0.125 lb. | 0.062 lb. |
| C | 95 | 86 | | |
| D | 88 | 35 | | |
| E | 91 | 37 | | |
| F | 100 | 99 | | |
| G | 100 | 94 | 82 | |
| H | 100 | 99 | 99 | 92 |
| L | 99 | 54 | | |
| N | 91 | 67 | | |
| R | 100 | 95 | | |
| S | 56 | 38 | | |
| T | 94 | 44 | | |
| U | 90 | 47 | | |
| V | 93 | 79 | | |
| W | 96 | 69 | | |
| X | 100 | 96 | 87 | |
| Y | 97 | 86 | 88 | |
| Z | 98 | 92 | 74 | |
| AA | 95 | 61 | | |
| AB | 56 | | | |
| AC | 83 | | 63 | |
| AD | 78 | 42 | | |
| AE | 73 | 54 | | |
| AF | 100 | 96 | 95 | |
| AG | 100 | 97 | 49 | |
| AH | | | 91 | 86 |
| AK | | | 100 | 92 |

Representative compounds of this invention were evaluated in a greenhouse test in which their value in eradicating apple scab was measured. In this test, apple seedlings were inoculated with a conidial suspension of apple scab spores, then allowed to incubate overnight under controlled temperature and humidity, after which the plants were held in the greenhouse until lesions appeared. At this point, the diseased apple seedlings were sprayed with aqueous suspensions of the cyclic amidines in a dosage series. About 5 days later, the amount of eradication was determined by the change in color and crispness of the lesions and the percent eradication calculated. The results are given in Table V.

TABLE V.—ERADICATIVE APPLE SCAB FUNGICIDE TESTS

| Compound (See Table II) | Percent Eradication of Apple Scab at— | | |
|---|---|---|---|
| | 2 lb. | 1 lb. | 0.5 lb. |
| C | | 93 | 86 |
| D | 50 | | |
| E | 90 | | |
| G | 70 | 41 | |
| H | | 89 | 71 |
| L | 51 | | |
| N | 61 | | |
| R | 81 | 37 | |
| T | 65 | | |
| U | 50 | 32 | |
| V | 64 | | |
| X | 78 | | |
| Y | 57 | | |
| Z | 44 | 31 | |
| AE | 85 | | |
| AF | 68 | 55 | |
| AG | 76 | 75 | |
| AH | | 83 | 48 |
| AK | | 57 | |

In this test, glyodin, a commercial fungicide based on 2-heptadecylamidazoline, when used at one quart and one pint of a 30% solution per 100 gallons of spray, gave essentially no eradication of apple scab.

Representative cyclic amidines were evaluated for the control of apple scab in a type of eradicative test in which a phenomenon known as "kick-back" is measured. In this test, apple seedlings were inoculated with a conidial suspension of *Venturia inaequalis* and then allowed to incubate overnight in humidity chambers at 65° F. Twenty-four hours later, the plants were sprayed to run-off with an aqueous suspension of the test chemical at a concentration of one pound per 100 gallons of spray. The plants were held in a greenhouse for about 11 days to allow disease lesions to develop. The percent disease control was calculated from the number of scab lesions which developed in the control plants (untreated) and in the treated plants. Table VI gives the results.

TABLE VI.—TWENTY-FOUR HOUR KICK-BACK APPLE SCAB FUNGICIDE TESTS

| Compound (See Table II) | Percent Control of Apple Scab at— | | |
|---|---|---|---|
| | 2 lb. | 1 lb. | 0.5 lb. |
| C | | 90 | |
| D | 89 | 49 | |
| H | | 96 | 89 |
| L | 59 | | |
| U | 51 | 51 | |
| AH | | 97 | 76 |
| AK | | 84 | |

In this test, glyodin, at a concentration of 1 quart of a 30% solution in 100 gallons of water gave essentially no control.

This kick-back test shows that cyclic amidines representative of this invention will give excellent control of apple scab disease which has been established for 24 hours, at practical rates of application.

A test was run in which compounds representative of this invention were evaluated for the control of tomato late blight in a persistency type test. In this evaluation, tomato plants at the four-leaf stage are sprayed to run-off with suspensions of the agents under evaluation in a dosage series and allowed to dry. They are then subjected to a heavy fog overnight and following this are placed in an illuminated test room held at 75° F. for 4 days. The plants are inoculated with a suspension of 30,000 spores per milliliter of *Phytophthora infestans* and the spores incubated by holding at about 52° F. and 100% relative humidity for about 22 hours. The plants are then held in the illuminated test room for about 42 hours until disease lesions develop and the lesions are counted. From the counts at the different dosages $ED_{50}$ and $ED_{90}$ values are calculated; that is, the dosage in parts per million giving 50% and 90% disease control.

Results are given below in Table VII in comparison with maneb, one of the best commercial fungicides used for tomato late blight control.

TABLE VII.—TOMATO LATE BLIGHT PERSISTENCY FUNGICIDE TESTS

| Compound (See Table II) | Parts Per Million Giving— | |
|---|---|---|
| | $ED_{50}$ | $ED_{90}$ |
| D | 383 | 1,599 |
| R | 226 | 1,104 |
| Maneb | 300 | 1,163 |

Thus, representative compounds of this invention are excellent for controlling tomato late blight.

In a manner similar to the above tomato late blight test, representative cyclic amidines were evaluated for their activity in controlling tomato early blight. In this test, a suspension of 25,000 to 30,000 spores per milliliter of *Alternaria solani* is used for the inoculation, and disease lesions develop in about 24 hours.

The results are given in Table VIII.

TABLE VIII.—TOMATO EARLY BLIGHT PERSISTENCY FUNGICIDE TESTS

| Compound (See Table II) | Parts Per Million Giving— | |
|---|---|---|
| | $ED_{50}$ | $ED_{90}$ |
| E | 242 | 889 |
| F | 177 | 904 |
| Z | 198 | 838 |
| AF | 575 | 4,040 |
| AG | 126 | 3,212 |
| AI | 447 | 2,940 |
| Maneb | 124 | 604 |

It has been demonstrated that representative cyclic amidines of this invention give good control of tomato early blight.

Cyclic amidines of this invention have been found to give good control of bacterial leaf spot of pappers, the causal organism of which is *Xanthomonas vesicatoria*. In this evaluation test, seedling papper plants at the 4 to 5 leaf stage are sprayed with a dosage series of the test compound, allowed to dry, then held overnight under light to produce open stomata. The next morning the plants are inoculated with a suspension of *X. vesicatoria* and put immediately into an incubator at 75° F. and high humidity and held for at least 4 hours. The plants are then placed in the greenhouse until bacterial leaf spots appear 5 to 7 days later. Lesions on treated plants and untreated controls are counted and the percent control calculated.

Table IX gives results obtained with typical cyclic amidines.

TABLE IX.—BACTERIAL LEAF SPOT OR PEPPER TESTS

| Compound (see table II) | Percent Control at— | |
|---|---|---|
| | 1 lb. | 0.5 lb. |
| C | 83 | 51 |
| D | 62 | 58 |
| F | 99 | 95 |
| G | 85 | 77 |
| H | 96 | 89 |
| J | 76 | 83 |
| K | ---------- | 76 |
| L | 96 | 94 |
| P | 79 | ---------- |
| Q | ---------- | 71 |
| R | 86 | 75 |
| T | 47 | ---------- |
| U | 67 | 58 |
| V | 55 | 50 |
| Y | 53 | ---------- |
| AA | 55 | ---------- |
| AC | 85 | ---------- |
| AD | 51 | ---------- |
| AF | ---------- | 49 |
| AG | 53 | ---------- |
| AI | ---------- | 94 |
| AJ | ---------- | 92 |

In a variation of the test for control of bacterial leaf spot, the cyclic amidines were evaluated for persistency. In this test, after the compounds were sprayed on, the plants were weathered in a heavy fog overnight and then inoculated. In this persistency test, it was shown that the percent control was increased somewhat.

We claim:

1. A method for controlling pytopathogenic fungi and bacteria comprising applying to the loci to be protected in an effective amount an agricultural composition comprising a carrier and a member selected from the group consisting of a cyclic amidine having the formula in which $R_1$, individually, is a member of the class consisting of alkyl of 1 to 24 carbon atoms, phenyl, naphthyl, benzyl and alkyl-substituted phenyl, naphthyl and benzyl in which the total alkyl substituents contain up to 16 carbon atoms;

$R_2$, individually, is a member of the class consisting of hydrogen and alkyl of 1 to 24 carbon atoms;

$R_1$ and $R_2$, collectively, form a ring, with the nitrogen atom to which they are joined, from the class consisting of morpholino, thiamorpholino, piperidino and pyrrolidinyl;

$R_3$ is a member of the class consisting of hydrogen, 2-hydroxyethyl, 2-aminoethyl, 3-hydroxypropyl, 3-aminopropyl, 2-(2-aminoethyl)aminopropyl, 3-(2-aminopropyl)aminopropyl, 2-(2-aminoethyl)aminoethyl and 3-(2-aminopropyl)aminoethyl;

X is a member of the class consisting of ethenylene, ethylene, trimethylene, alkyl and alkenyl-substituted ethylene having a total of up to 20 carbon atoms, 1,2-cyclohexylene, 1,2-cyclohexenylene, alkyl-substituted 1,2-cyclohexylene and 1,2-cyclohexenylene having a total of up to 16 carbon atoms, 3,6-methano-1,2-cyclohexylene and 3,6-methano-1,2-cyclohexenylene; and D is a member of the class consisting of 1,2-cyclohexylene and a divalent saturated chain of 2 to 3 carbon atoms whose available valences are satisfied by members of the class consisting of hydrogen and alkyl and combinations thereof in which said alkyl has a total of up to 12 carbon atoms and the acid-addition salts of said amidine.

2. A method according to claim 1 which comprises applying to foliage said agricultural composition in a spray.

3. A method according to claim 1 directed to the control of phytopathogenic fungi which comprises spraying on the loci to be protected an effective amount of said agricultural composition.

4. A method according to claim 1 directed to the control of phytopathogenic bacteria which comprises spraying on the loci to be protected an effective amount of said agricultural composition.

5. A method according to claim 1 directed to the control of *Venturia inaequalis* on apple foliage and fruit which comprises spraying on the loci to be protected an effective amount of said agricultural composition.

References Cited by the Examiner

Jilek et al., Collections of Chemical Communications of Czechoslovakia, volume 15, pp. 659–670 (1950).

JULIAN S. LEVITT, *Primary Examiner.*

VERA C. CLARKE, *Assistant Examiner.*